(12) United States Patent
Ng et al.

(10) Patent No.: US 9,070,209 B2
(45) Date of Patent: Jun. 30, 2015

(54) MOVING CONTROL CONSOLE

(71) Applicants: VOLKSWAGEN AG, Wolfsburg (DE); AUDI AG, Ingolstadt (DE)

(72) Inventors: Brian Ng, San Francisco, CA (US); Maria Esther Mejia Gonzalez, Braunschweig (DE); William Brian Lathrop, San Jose, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 160 days.

(21) Appl. No.: 13/723,935

(22) Filed: Dec. 21, 2012

(65) Prior Publication Data
US 2014/0180537 A1    Jun. 26, 2014

(51) Int. Cl.
*G06F 7/00* (2006.01)
*G06T 13/00* (2011.01)
*B60K 35/00* (2006.01)
*G06F 3/048* (2013.01)

(52) U.S. Cl.
CPC ............... *G06T 13/00* (2013.01); *B60K 35/00* (2013.01); *G06F 3/048* (2013.01); *G06F 2203/04803* (2013.01)

(58) Field of Classification Search
None
See application file for complete search history.

(56) References Cited

U.S. PATENT DOCUMENTS

| | | |
|---|---|---|
| 2008/0211693 A1 | 9/2008 | Okuno et al. |
| 2009/0085383 A1* | 4/2009 | Hicks et al. ............... 297/217.3 |
| 2009/0275366 A1* | 11/2009 | Schilling ...................... 455/566 |
| 2010/0016041 A1 | 1/2010 | Ying et al. |
| 2010/0231547 A1* | 9/2010 | Pryor ........................... 345/173 |
| 2013/0154298 A1* | 6/2013 | Ricci ......................... 296/37.12 |
| 2013/0197364 A1* | 8/2013 | Han ............................. 600/440 |

FOREIGN PATENT DOCUMENTS

DE     102010001323 A1     8/2010

* cited by examiner

*Primary Examiner* — Thomas Tarcza
*Assistant Examiner* — Adam Alharbi
(74) *Attorney, Agent, or Firm* — Barnes & Thornburg LLP

(57) ABSTRACT

A moving control console having a touchscreen, a motor connected to the digital display unit and a housing in which the digital display unit is movable in different stages. The user interface graphics animations on the digital display are matched to the movement of the digital display.

11 Claims, 4 Drawing Sheets

MOVING CONTROL CONSOLE

FIELD

Disclosed embodiments relate to electronic devices for displaying information for a driver in a motor vehicle and, more particularly, to self-aligning graphics user interface animations matching the position of the electronic devices.

BACKGROUND

Automotive manufacturers have introduced numerous electronic devices that are integrated into the interior body of a vehicle for providing information to the driver. These electronic devices comprise digital displays with touch screens to enable the drivers and other occupants to access multitudes of information and functions. The displays can be configured to display information like in-vehicle temperature, speed, navigation data, audio and visual entertainment and any data stored within the vehicle controller. The displays can be operated by the user by moving a finger over the touch screen and selecting or changing the functions.

There are drawbacks to the use of displays in vehicles. The displays can be difficult to operate while the vehicle is moving due to the size of the display and the graphics which are often very small. Further,* the user is presented with large quantities of data with less or no possibility to minimize the displayed information by dividing it into sections. 'It becomes difficult for the' user to navigate through the lists or pages on the display. The user has to page through different menus to come to the desired level of functions.

SUMMARY

Disclosed embodiments provide user interface graphics animations on the digital display that are matched to the physical movement of the actuated digital display unit. This will assist the user to easily navigate through the data as the information will be presented in sections, according to the size of the display. The digital display unit comprises a touchscreen, a motor and it is assembled in a housing in which the digital display unit moves up and down in different stages.

BRIEF DESCRIPTION OF THE DRAWINGS

Disclosed embodiments will be more apparent upon consideration of the following detailed description taken in conjunction with accompanying drawings, in which like reference characters refer to like parts throughout.

DETAILED DESCRIPTION OF EXEMPLARY EMBODIMENTS

In at least one disclosed embodiment, the user interface graphics motion on the digital display is matched to the speed of the motor driving the digital display up and down. The user interface graphics remain in the same position relative to the base of the digital display while the digital display is in motion and while it is stationary.

According to another disclosed embodiment, the different physical stages of the digital display correspond to the number of interactive functions available to the user. These interactive functions include at least inputting the—control instructions and or functions on the touch screen of the displayed portion of the screen.

According to another disclosed embodiment, the digital display unit and the housing are arranged in the rear center console box of a motor vehicle and the digital display is configured to display and control at least climate comfort data, navigation data, audio and visual entertainment data and other data to the rear seats passengers respectively comprising at least a physical climate system controls.

According to yet another disclosed embodiment, the display unit is arranged on the instrument panel in the center console of the motor vehicle. The display unit comprises a display with touchscreen and a cover covering at least a portion of the display. The opening movement of the cover extends the size and functionalities of the display. The user interface graphics animations follow the physical action of the cover opening and closing by depicting a virtual closing and opening of a door. The movement of the cover over the display corresponds to the number of interactive functions available to the user. The interactive functions available to the user include inputting the control instructions on the touchscreen of the displayed portion of the display. The display is configured to display and operate navigation data, audio and visual entertainment data, climate comfort data and other types of data.

Figure 1:
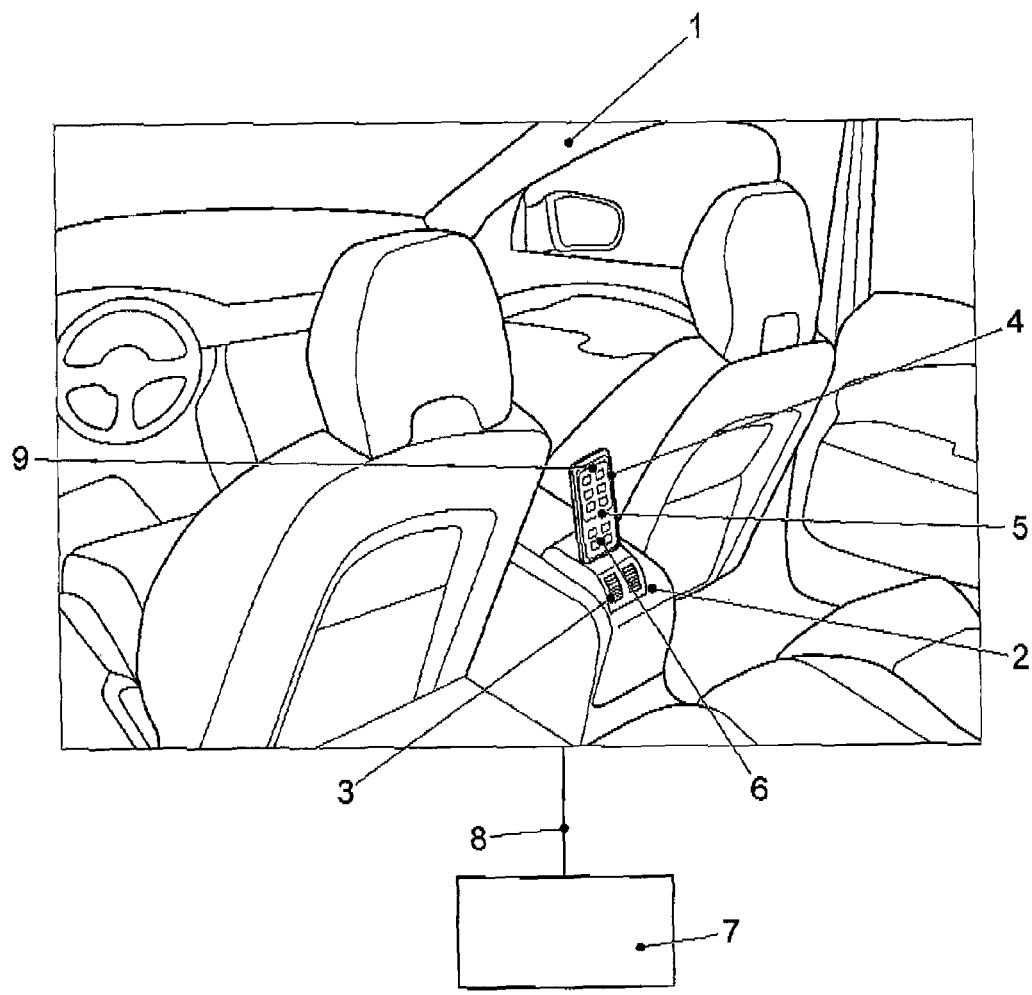
FIG. 1 is a schematic perspective view of a vehicle rear center console box incorporating a display screen according to at least one disclosed embodiment.

FIG. 1 illustrates a rear center console box 2 for a vehicle 1. FIG. 1 depicts inter alia the heating, venting and air conditioning vents 3 arranged on the rear center console box 2. A moving control and display unit 4 is arranged on the rear center console box 2 behind the heating, venting and air conditioning vents 3. The moving control and display unit 4 is arranged for being raised and lowered relative to the rear center console box 2. The rear center console box 2 further comprises a powered motor for raising and lowering the moving control and display unit 4 in at least three different stages.

The moving control and display unit 4 comprises a digital display 5 for displaying user interface, graphics 6 retrieved from the vehicle controller 7. The user interface graphics 6 comprises information displayed on the digital display 5 that may be information processed by the controller 7 such as navigation data, outside air temperature data, and audio and entertainment data. The controller 7 is also connected to other parts of the vehicle through a data bus B. Information on seat adjustments, light and temperature controls for the rear end of the vehicle is connected to the controller 7 through the data bus 8. The digital display 5 is configured to display all the information stored and processed by the controller 7. The moving control and display unit 4 comprises further a touchscreen 9 for controlling the user interface graphics 6 displayed on the digital display 5. The displayed user interface graphics 6 on light, seat adjustments and temperature for the rear end of the vehicle are adjusted through the touchscreen 9. More user interface graphics 6 like telephone data and audio and entertainment data may be viewed and controlled on the moving control and display unit 4.

The movement of the user interface graphics 6 displayed on the digital display 5 is matched to the speed of the motor raising and lowering the moving control and display unit 4. The user interface graphics 6 remain in the same position relative to the base of the digital display 5 while the digital display is in motion and while it is stationary. The motion of the moving and control display unit 4 is adjusted through the user interface graphics 6 on the touchscreen 9.

Figure 2A:
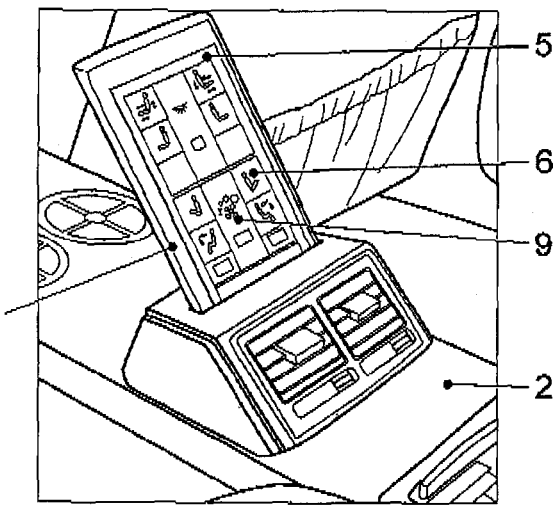
FIG. 2a is a schematic perspective fragmentary view of a vehicle rear center console box of FIG. 1 with the display screen in the first physical stage.

FIG. 2a is a schematic perspective fragmentary view of a vehicle rear center console box 2 with the moving control and display unit 4 in the first physical stage. The moving control and display unit 4 is in a fully extended position. The user interface graphics 6 are matched to the size of the digital display 5. The user interface graphics 6 depict at least two independent functionalities; for example, the top part of the digital display 5 depicts rear-seats adjustment graphics and the bottom part of the digital display 5 depicts temperature adjustments for the rear end of the vehicle. The user interface graphics 6 can be controlled through the touchscreen 9 to make the respective adjustments.

Figure 2B:
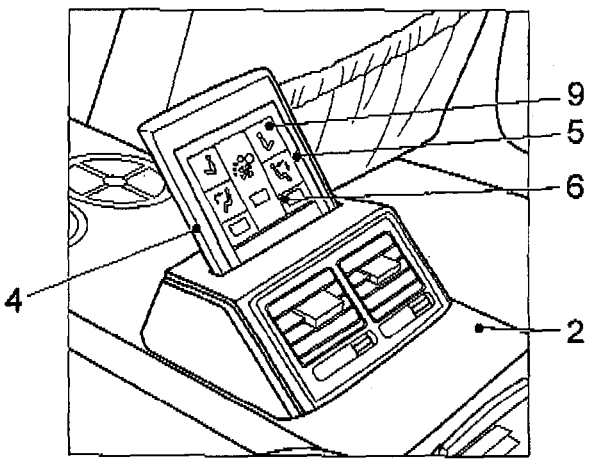
FIG. 2b is a schematic perspective fragmentary view of a vehicle rear center console box of FIG. 1 with the display in the second physical stage.

FIG. 2b is a schematic perspective fragmentary view of a vehicle rear center console box 2 with the moving control and display unit 4 in the second physical stage. The moving control and display unit 4 is halfway retracted. The user interface graphics 6 depict at least one set of functionalities; for example the temperature adjustments which can also be controlled through the touchscreen 9.

Figure 2C:
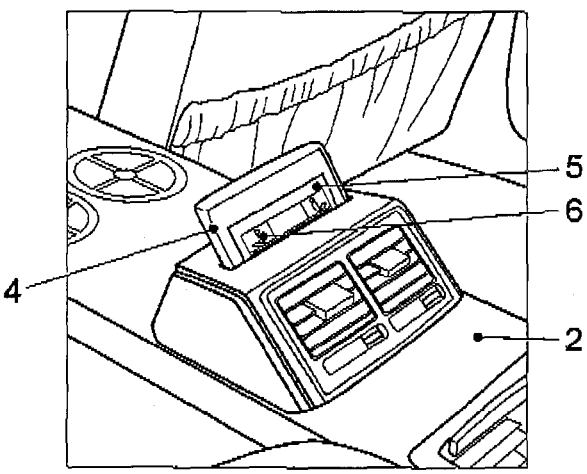
FIG. 2c is a schematic perspective fragmentary view of a vehicle rear center console box of FIG. 1 in the third physical stage.

FIG. 20 is a schematic perspective fragmentary view of a vehicle rear center console box 2 with the moving control and digital display unit 4 in the third physical stage. The third stage depicts only the bottom part of the display which shows for example, the current temperature settings for the rear end of the car. The digital display 5 may still be controlled through the user interface graphics 6 to either extend the size of the digital display unit or to completely retract it. The user interface graphics 6 in (FIG. 2a-2c) can depict icons on navigation, audio and entertainment, telephone and other information in the vehicle which can be used as shortcuts to the main functions on the extended digital display.

Figure 3A:
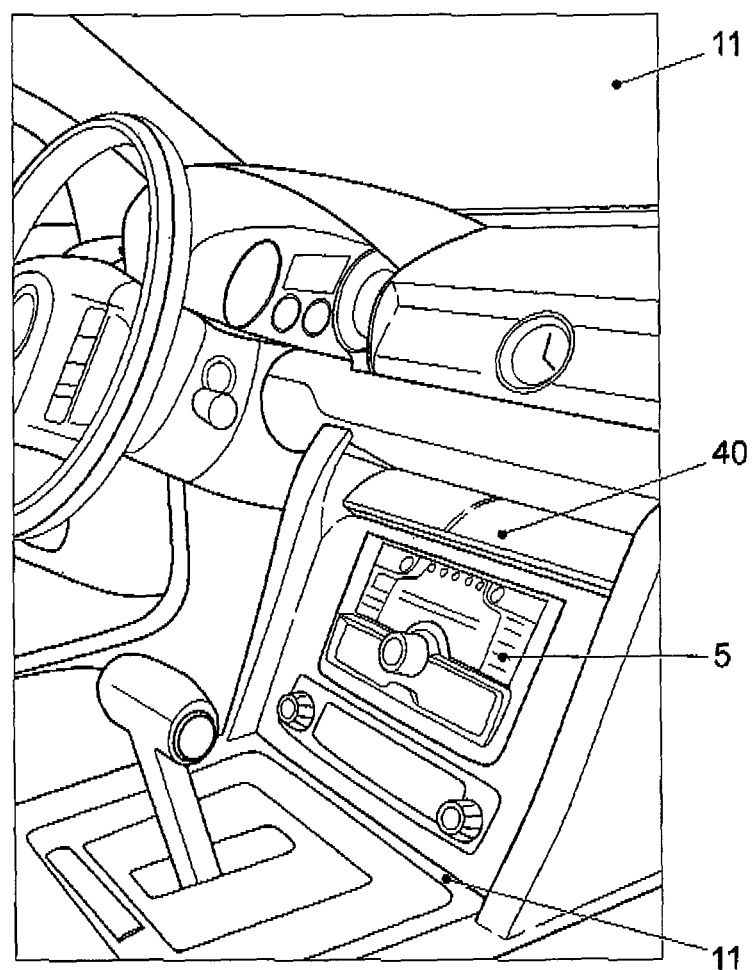
FIG. 3a is a schematic perspective fragmentary view of a vehicle instrument panel with a display screen in a retracted position.

FIG. 3a is a schematic perspective view of a vehicle 1 instrument panel incorporating a digital display 5 according to at least one disclosed embodiment. The digital display 5 is seated within the middle console 11 of a vehicle. A cover 40 which partly covers the digital display 5 is attached to the console. The cover 40 is arranged for being raised and lowered over the digital display 5.

Figure 3B:
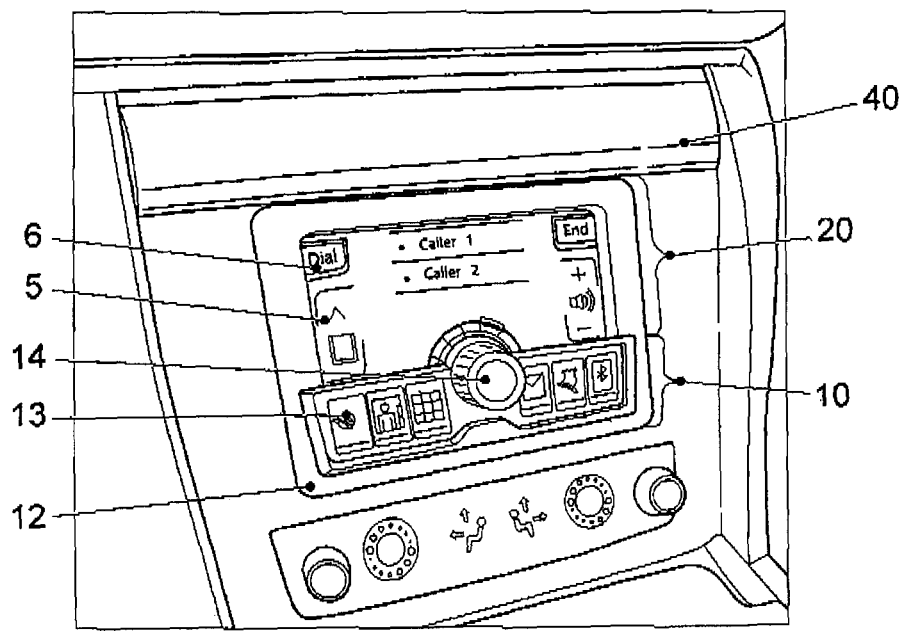
FIG. 3b is a schematic perspective fragmentary view of a vehicle instrument panel with a display screen in an extended position.

FIG. 3b The console further comprises a motor which powers the movement of the cover 40. The digital display 5 is divided into two portions 10 and 20. The first portion 10 is masked with plastic or metal bezels 12 which are divided into small sections. The physical division of the small sections corresponds to the virtual divisions of the soft keys 13. The soft keys 13 are submenus of the main menus. The main menus are selected through the push/turn control knob 14 which is assembled on the middle of the bezels 12. FIG. 3a depicts an example of the telephone main menu. The submenus are functions for contacts, call, dial, message etc.

The another disclosed embodiment, second portion 20, of the digital display 5 depicts a larger portion of the display with user interface graphics animations, The second portion 20 is depicts an extension of functions from first portion 10. In the telephone menu function, a list of contacts may be depicted in the second portion 20. The second portion 20 also has soft keys for opening and closing the cover 40. The movement of the cover 40 is triggered by selecting the soft keys. The upward movement of the cover 40 is matched by the user interface graphics animations which follow the physical action of the cover 40 opening and closing. The user interface graphics animations follow a virtual example of a door opening in the context of the vehicle environment. This movement extends the third portion 30 of the screen.

Figure 3C:
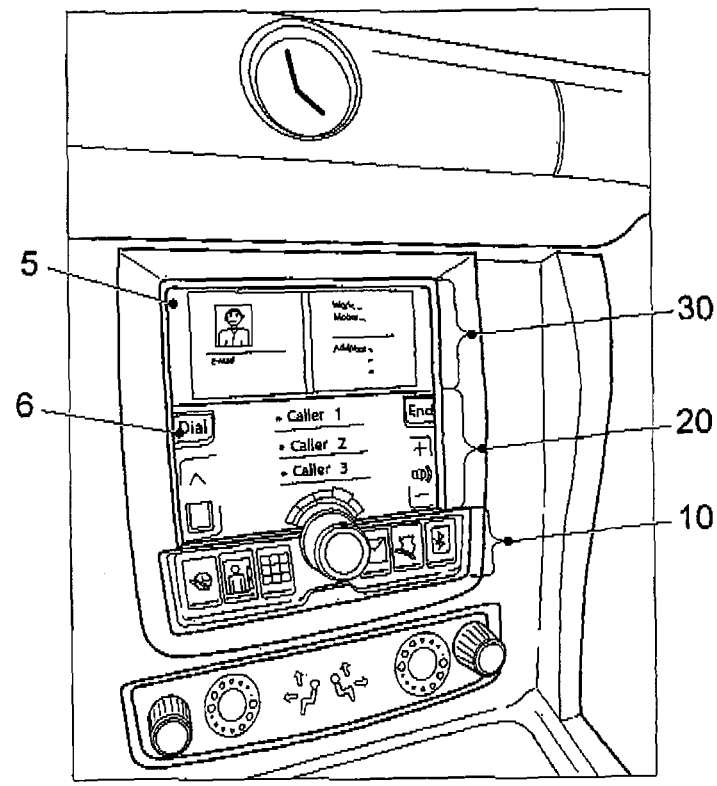
FIG. 3c is a schematic perspective fragmentary view of a vehicle instrument panel with a display screen in a further extended position.

FIG. 3c depicts a further disclosed embodiment with the third portion 30 of the digital display 5. The user interface graphics in the third portion 30 can be selected and controlled independent of the graphics in first 10 and second portions 20. The user interface graphics functions of the third portion 30 are, however, an extension of the functions in the first 10 and second portions 20. In the telephone menu, the third portion 30 depicts a contact list in a form of a book. The user can virtually page through the book to look for contacts as it is known in state of the art. In the navigation menu, the second portion 20 would only depict the turn-by-turn navigation and the third portion 30 would depict the navigation on the map. In the audio menu, the second portion 20 would depict the current playing item and the third portion 30 would depict different music covers which may be moved in different directions to select the desired item.

The disclosed embodiments in the figures describe the present invention and it should be understood that these embodiments are, offered by way of example. Other menus or functionalities may be used that follow the same user interface graphics animations as described in the invention. The disclosed embodiments extend to various modifications that fall within the scope of the appended claims.

What is claimed is:

1. A moving control console comprising:
   a digital display unit implemented as a touchscreen;
   a motor connected to the digital display unit; and
   a housing in which the digital display unit is movable to different positions to move in and out of the housing, wherein user interface graphics animations displayed on the digital display are aligned relative to the digital display based on the position of the digital display as the digital display moves relative to the housing, such that the user interface graphics remain in a same position relative to the visible portion of the digital display while the digital display is in motion and while the digital display is stationary.

2. The moving control console of claim 1, wherein the user interface graphics animation on the digital display is matched to the speed of the motor driving the digital display up and down.

3. The moving control console of claim 1, wherein the different positions of the digital display unit correspond to the number of interactive functions available to the user and visible on the visible portion of the digital display.

4. The moving control console of claim 3, wherein the number of interactive functions available to the user include at least inputting the control instructions on the touchscreen of the displayed portion of the display.

5. The moving control console of claim 1, wherein the digital display and the housing are arranged in the rear center console box of a motor vehicle comprising at least a physical climate system controls.

6. The moving control console of claim 5, wherein the digital display is configured to display and operate at least a climate comfort data of the rear part of the motor vehicle.

7. The moving control console of claim 1, wherein the digital display is configured to display and operate navigation data, audio and visual entertainment data and other types of data for rear seats passengers.

8. A method for operation of a moving control console, the method comprising:
    displaying graphics animations on a digital display unit including a touchscreen that displays user interface graphics animations;
    receiving at least one command to move the digital display unit;
    moving the digital display unit in relationship to a housing in which the digital display unit is provided at different positions; and
    matching the user interface graphics animations displayed on the touch screen to movement of the digital display in and out of the housing, such that the user interface graphics animations displayed on the digital display are aligned relative to the digital display based on the position of the digital display as the digital display moves relative to the housing, such that the user interface graphics remain in a same position relative to a visible portion of the digital display while the digital display is in motion and while the digital display is stationary.

9. The method of claim 8, wherein the matching of the user interface graphics motion on the touch screen is matched to a speed of the motor driving the digital display up and down.

10. The method of claim 8, wherein the different positions of the digital display unit correspond to a number of interactive functions available to a user and visible on the visible portion of the digital display.

11. The method of claim 10, wherein the number of interactive functions available to the user include at least inputting the control instructions on the touchscreen of the displayed portion of the display.

* * * * *